United States Patent Office 2,952,078
Patented Sept. 13, 1960

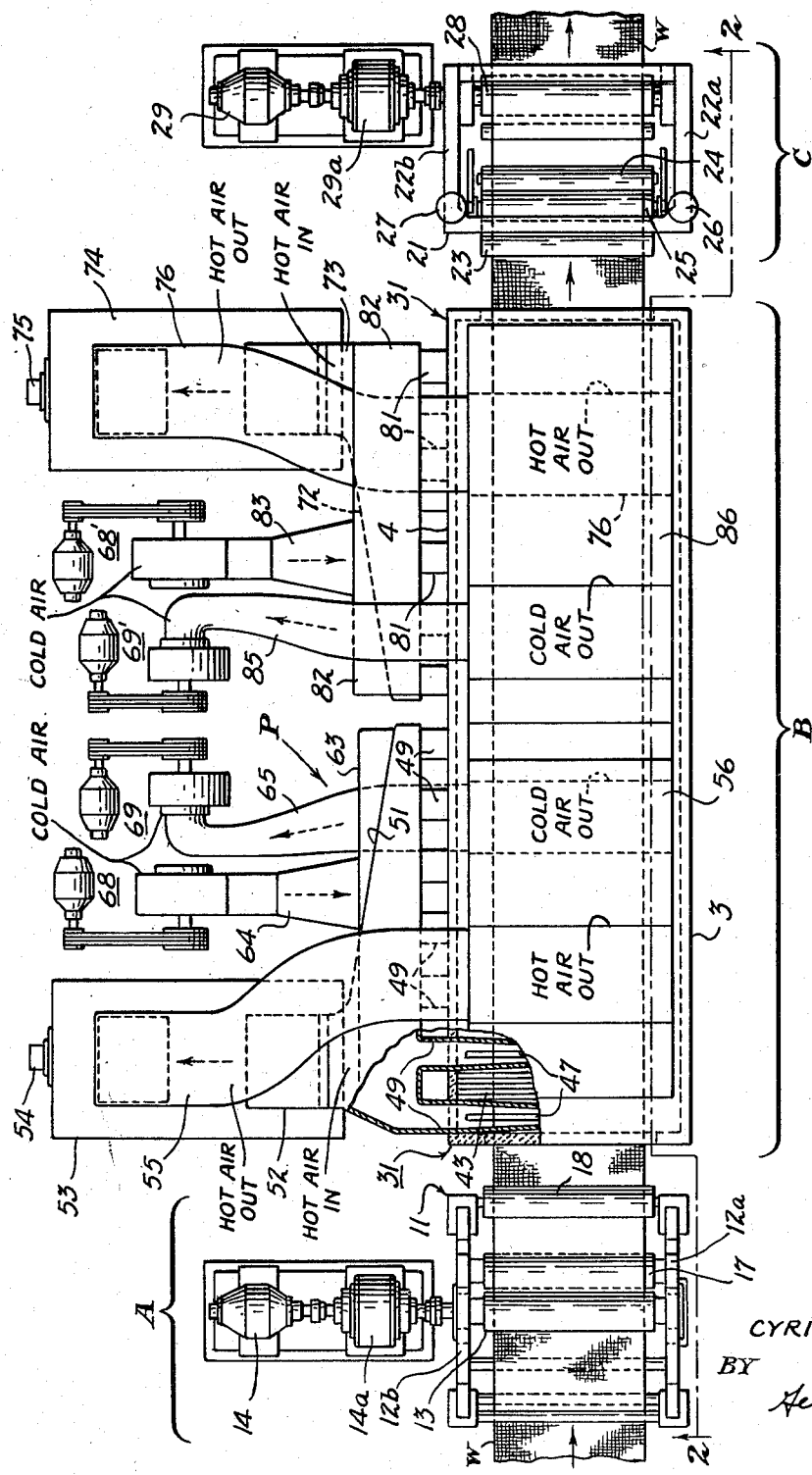

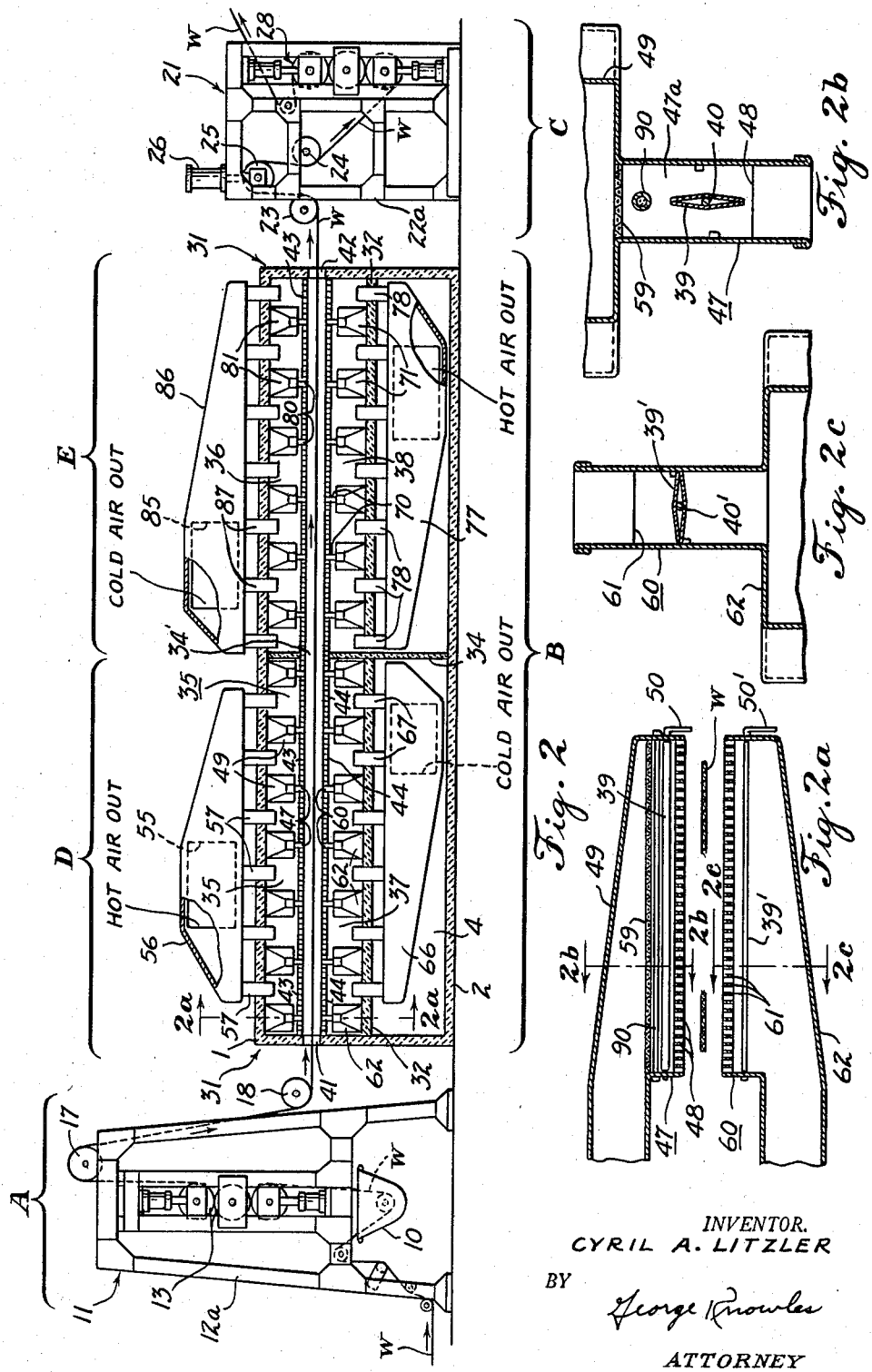

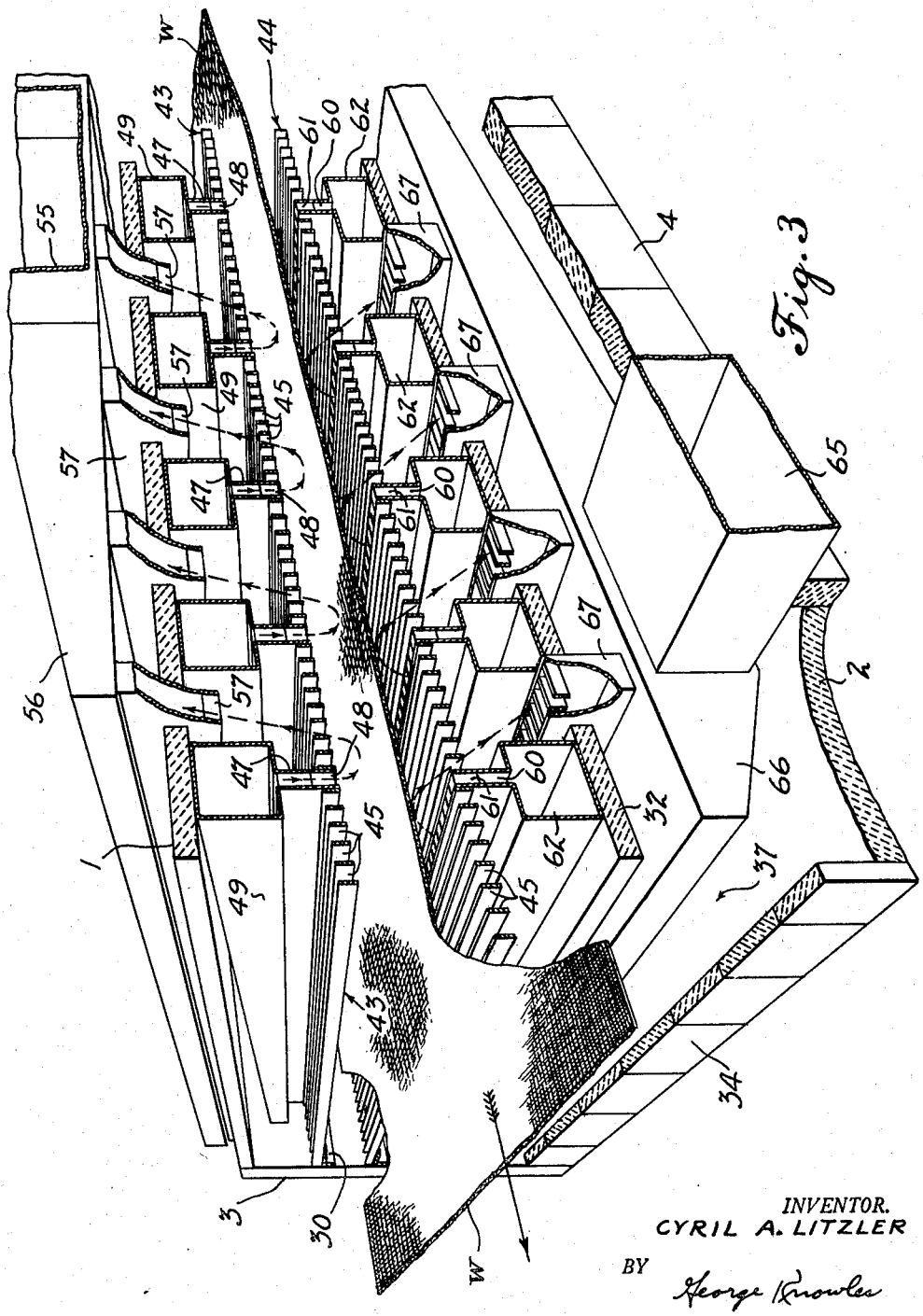

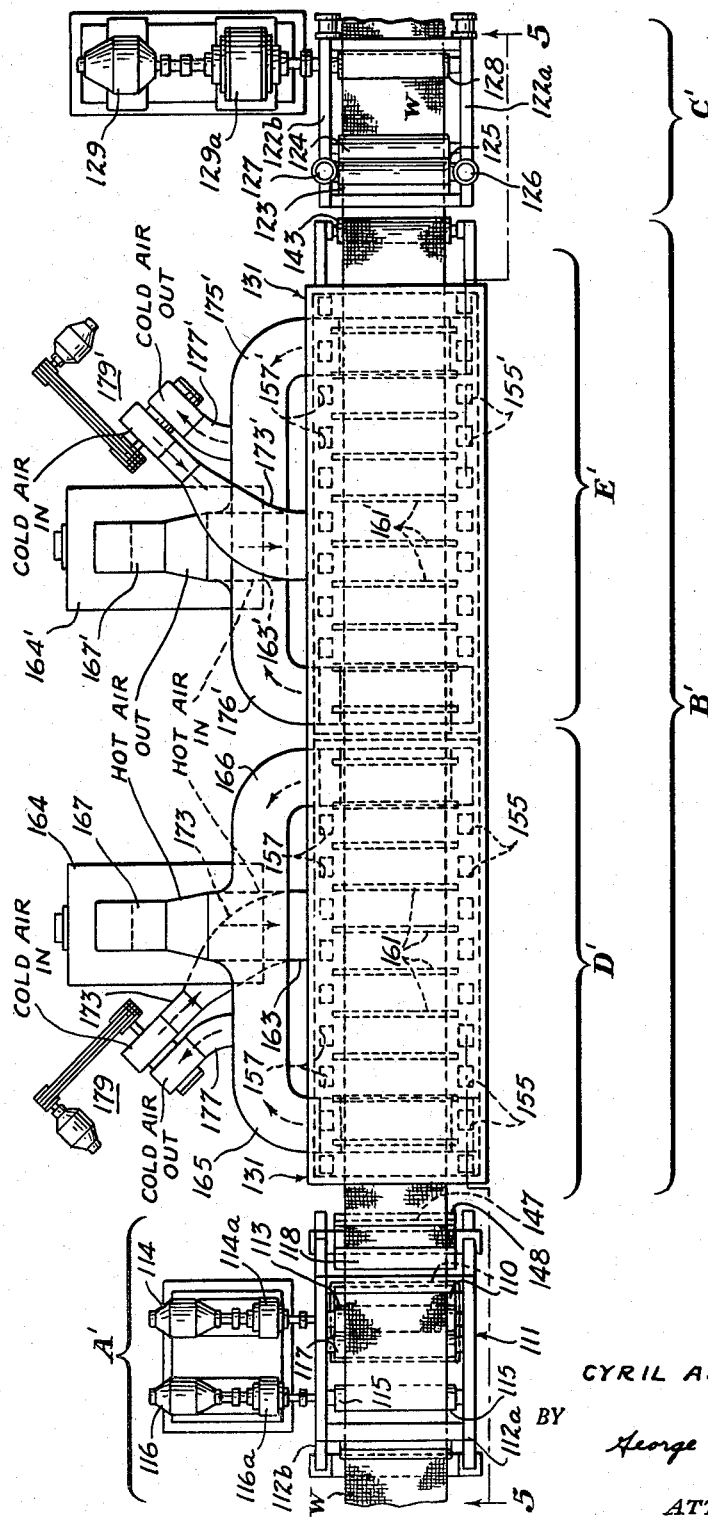

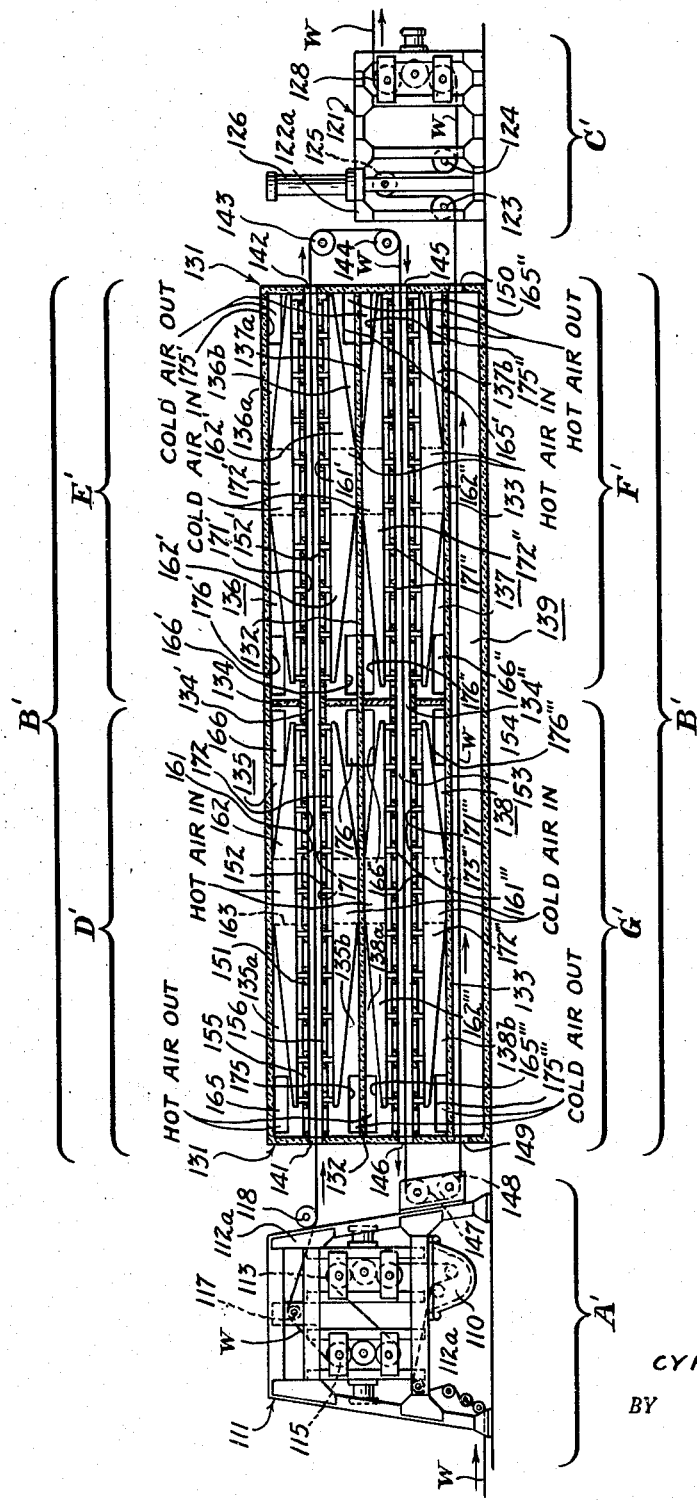

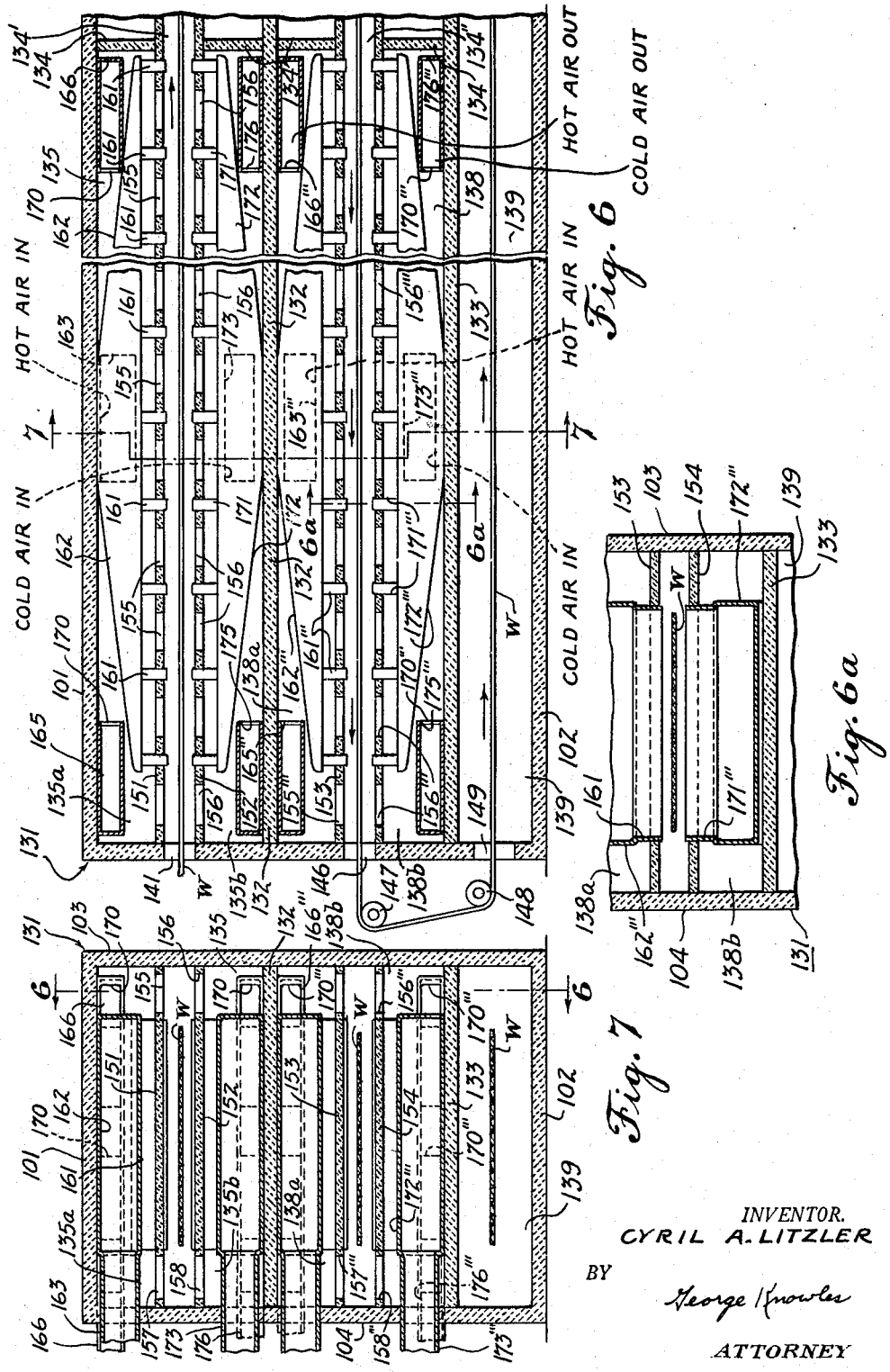

2,952,078

APPARATUS FOR CONTROLLED HEATING AND COOLING OF CONTINUOUS TEXTILE MATERIAL

Cyril A. Litzler, 16802 Lucille Ave., Lakewood, Ohio

Filed Nov. 30, 1953, Ser. No. 395,157

23 Claims. (Cl. 34—68)

This invention relates to apparatuses and processes for hot-stretching a textile fabric in the form of a continuously traveling web, particularly a textile fabric having a warp of thermoplastic material such as nylon or Dacron or a polyester resin or the like.

In textile fabrics intended for use in mechanical rubber goods, it is desirable and sometimes necessary to take up or eliminate most or all of the natural extensibility of the warp threads, which in the case of nylon is frequently as high as 16% and may be much higher. Whereas elasticity is not objectionable, extensibility as opposed to elasticity is not usually desired. Some extensibility may be tolerated in the case of fabrics intended for certain products; e.g., bumpers, packings and similar products that are primarily for resisting compressive stresses, but for most other products, including automobile and truck tires, an extensibility of the order of 16% is far too high. It is known that in the case of threads of synthetic origin excessive extensibility can usually be eliminated by stretching at super-atmospheric temperatures on or between rolls rotating at different speeds; however, the apparatus and processes known to the prior art for carrying out such operations on fabrics have not been capable of controlling to maximum advantage the heating and stretching steps, which are often critical in their effect.

In the development of fabric materials, particularly those used in the rubber industry for reinforcement of pneumatic vehicle tires and the like, various treatments have been resorted to for the purpose of improving the physical properties of the fabric materials. It is common, for example, to stretch the material prior to coating it with rubber or after coating but before assembly into tires and similar articles. It is known that the bond between the fabric material and the rubber, whether the latter be natural or synthetic, can be appreciably increased by preliminarily applying to the fabric material suitable adhesives and bonding agents together with natural or synthetic rubber. The rubber to be so applied may comprise a liquid latex dip with the adhesives, bonding agents and other additives in solution. The treatment of the fabric material has, of course, combined the stretching and dipping as by passing a web of the material under a roller immersed in the liquid dip while maintaining tension on the web. As a further treatment procedure it has been proposed to heat the fabric material either to effect drying of the dip solution or to obtain added benefits in the stretching operation such as reduction in power requirements and elimination of a percentage of the potential elongation that otherwise would remain in the treated material. In some instances the treatment of the fabric material has included stretching and heating a well as the dipping.

When the fabric material comprises linen or cotton or even rayon, the accomplishment of the various dipping, heating and stretching treatments has been obtained by the use of conventional procedures and equipment. With the advent of new types of synthetic fibers and fabrics, especially the thermoplastics such as nylon, Dacron and the like, some difficulty has been encountered in obtaining the desired dipping, stretching and heating on a reliable basis. This has been especially true with respect to the heating of the fabric material while under tension.

Thermoplastic materials such as nylon and Dacron must be processed under conditions of relatively close control as compared to cotton and rayon; the time of exposure to heat is considerably shorter, and the stretching tension is considerably greater.

The characteristics of thermoplastics such as nylon and Dacron are such that for any condition of tension and for each type of fiber there is a relatively narrow temperature range over which the stretching can be performed with optimum results. If the fibers are subjected to temperatures appreciably in excess of the critical range, the stretching operation will not produce the desired beneficial results and the fabric will not have the tensile strength or elongation required. On the other hand, if the stretching operation is performed while the fibers of the fabric material are at a temperature appreciably below the critical range, the physical or molecular rearrangement will not be that which is desired and the physical properties of the fabric will not be as required.

With respect to the duration of the stretching operation wherein the fabric is subjected to tension while maintained at an elevated temperature, it appears that because of the thermoplastic nature of the fibers and because they are at or near the softening temperature, exposure of the fabric to heat for an extended period produces deleterious effects on the fabric's physical properties, particularly tensile strength. Therefore proper heating time must be maintained regardless of the speed of the fabric travel through the system.

Constant heating time with variable fabric speed is accomplished by supplying heated gas such as air to the traveling fabric web by a system of zone and sub-zone control in which dampers or valves govern the supply of heated gas or air individually to a plurality of localized sub-zones distributed over one or more main zones or stages along the path of the traveling web. In the preferred and more specialized arrangement each heating sub-zone (and, where quenching or cooling by gas or air is to be provided, each cooling sub-zone) extends across the entire width of the web but is of relatively short length in the direction of web travel, being, say, of several times greater extent transverse to the web path than longitudinally thereof. In a still more refined version of the invention the several localized heating sub-zones are distributed sequentially along the path of web travel in close order one after another, desirably without the use of physical barriers or partitions to separate one sub-zone from its neighboring sub-zone or sub-zones. This feature is accomplished, say, by providing for the admission of heated air into each of the several heating sub-zones by suitable nozzles or orifices and by withdrawing such air after exposure of the traveling web thereto, as by impingement of the air in the form of a jet or jets. The withdrawal is accomplished through suitable exit means which may take the form of vents located between the supply jets. The temperature of the heated air for treating the fabric depends upon the particular thermoplastic involved and, of course, upon the time of exposure and the tension. Temperatures over the range of from as low as about 325° F. to as high as about 550° F. can be used with good results, although a temperature of about 400° F. to about 450° F. is preferred for fabrics such as nylon. Thus the invention envisions an interleaved arrangement of supply jets and exhaust vents arranged in alternating relation along and in the direction of web travel.

So that temperature regulation of the traveling web may be held within the desired close limits referred to, provision is made not only for the regulated supply of heated air but also for the regulated supply of relatively cold or room temperature air by a similar method and apparatus. The present process and system arranges for the optional heating or cooling of the traveling fabric web along the same portion or portions of the web path and while the web is under continuous tension. Thus by application of relatively cold or room temperature air (in the neighborhood of from about 60° F. to about 80° F.) there is accomplished a "setting" or "quenching" of the heat treated fabric, the "setting" occurring during the travel of the web over a path or through a stage or zone which desirably immediately follows the path stage or zone along which the heat treatment takes place. By such an arrangement the "setting" of the fabric occurs immediately or instanter upon completion of the heat treatment. The application of the cooling air in precise relationship to the heating air thus limits the action of the heating medium and serves to quench (and terminate) the heat treat operation. This setting or quenching operation is done precisely relative to heating time which is a function of the speed of the traveling fabric web. The variable dampering of the heating and cooling air in the sub-zones serves to give variable time length to either or both the heating and cooling operations.

For reasons of compactness and space relationship in the physical structure of the apparatus and for precise limitations of heating time the fabric web is heated from one (say the top) side of its plane of travel and is cooled from the other (say the bottom) side. The fabric travel path or plane is centered between the nozzles or orifices which provide the heating and cooling impingement jets. In the treatment of the traveling web in successive zones or stages in each of which provision is made for optional heating on one side or cooling on the other it is advantageous to arrange the jets or other heating and cooling means so that in one stage or zone the heating is accomplished from one side, say the top, while in the next stage or zone the heating is accomplished from the other side, say the bottom. In the said one stage, then, cooling, if desired, is accomplished from the other or bottom side and in the said other stage any desired cooling is accomplished from the first mentioned one or top side. The heating from alternate sides provides a stabilized thermal condition in the fabric and at the same time provides an efficient physical arrangement of heating and cooling jets.

In the stage or zone and sub-zone control heating system contemplated it is feasible, of course, to provide hot air supply jets for impingement of the hot air simultaneously against opposite sides of the traveling web for rapid and uniform heating and, while the quenching or chilling operation can similarly be accomplished by the impingement of relatively cool air jets simultaneously against the opposite sides of the traveling web after the pass through the heat treatment stage, stages, zone or zones, it is one of the advantageous features of the present invention that during the heat treatment the hot air supply jets direct the air against only one side of the traveling web along any given portion of the web path. On the other side of the web at each such path portion there is provided a supply system for relatively cool air maintained in a stand-by condition ready to chill the web from the opposite side to that on which it is heated. Thus in the event of an inadvertent stoppage of the traveling web it is possible to terminate the supply of heated air in the heating zones and sub-zones and immediately and simultaneously to supply to the opposite side of the web the relatively cold air which serves to reduce the web temperature below the critical range so that the fabric fibers are not harmed during the stoppage. As a further refinement of the arrangement which provides hot air supply ducts on one side and cold air supply ducts on the other side of the traveling web path in a zone control system it is feasible to convert certain sub-zones, zones or portions of the hot and cold air supply systems from hot to cold and cold to hot in rapid succession so as instantly to vary the lengths of the heating and cooling portions of the web path.

This invention thus has for one of its objects to increase the degree and enhance the effect of the control or controls that may be exercised in such circumstances by alternately heating a continuously traveling web of textile fabric from opposite sides of the web; that is to say, heating first from one side in one zone and then on the other side in another zone. Another object of the invention is to provide means for increasing or decreasing by relatively small increments the length of that portion of the path of travel of the web in which the web is in its heating phase as opposed to a subsequent cooling phase. Still another object of the invention is to provide a system of this kind which provides for stopping the supply of hot air and immediately supplying cold air in the event of stoppage of the apparatus.

The invention further has for another of its objects to provide apparatus in which the foregoing objects may be accomplished optionally in one pass or in several passes of the web through the apparatus. A further object of the invention is to provide apparatus of this kind in which the path of travel of the web, whether characterized by one pass or several passes, is flanked on both sides in such manner as to confine the web in the event of breakage, thereby minimizing the possibility of damage to other parts of the installation occasioned by the sudden release of a large quantity of energy. According to a specialized version of this aspect of the invention the path of travel of the web is flanked by elements of low thermal inertia through which hot air or cold air may be easily supplied to and withdrawn from the web.

Still a further object is to provide an installation of the kind described in which the web is subjected to hot-stretching in an area located between two roll-tensioning instrumentalities which together are capable of applying to the web a tension of the order of about 10,000 to about 20,000 pounds, more or less, by a forward pull on the web or a combination of a forward pull and a backward pull. In a preferred arrangement of an installation of this type at least one of the two roll-tensioning instrumentalities includes a group of three idler rolls arranged in toggle fashion, thus providing a firmer grip on the web.

A further object is to provide such an installation in which one of a cooperating set of three idler rolls is mounted well above but is movable at the will of the operator in a direction toward or away from the common plane of the axes of the other two rolls of the set, thus permitting of enhancement or relaxation of the tension on the web and affording a convenient control point for sensing means governing the pull and hold back rolls.

Other objects and advantages of the invention will be apparent from the description which follows and from the accompanying drawings which form a part of the specification and in which:

Figure 1 is a plan of a single pass system of the kind described in which the web is hot-stretched in a stage or zone located between two roll stands or web holding devices;

Figure 2 is a corresponding side view with certain parts, not including the roll stands, in vertical section, this view being taken substantially along the line 2—2 of Fig. 1;

Figure 2a is a fragmentary sectional detail with parts omitted taken substantially along the line 2a—2a of Fig. 2 and enlarged with respect to that figure to show the air inlet jet above and below the web path and the dampers for controlling the flow of air through such jets;

Figure 2b is a fragmentary sectional detail taken substantially on the line 2b—2b of Fig. 2a and enlarged with respect to that figure;

Figure 2c is a fragmentary sectional detail taken substantially on the line 2c—2c of Fig. 2a and enlarged with respect to that figure;

Figure 3 is a perspective, with parts broken away, of a portion of the apparatus of Figures 1 and 2, this view being taken substantially in the direction of the arrow P of Fig. 1;

Figure 4 is a plan of a multiple pass system of the kind described;

Figure 5 is a corresponding side view with the roll stands in elevation and other parts in vertical section, this view being taken substantially along the line 5—5 of Fig. 4;

Figure 6 is a fragmentary foreshortened view on an enlarged scale of part of the apparatus shown in section in Figure 5;

Figure 6a is a fragmentary sectional detail with parts omitted taken substantially along the line 6a—6a of Fig. 6; and Figure 7 is a transverse vertical section with parts broken away and removed, this view being taken substantially on line 7—7 of Figure 6.

In the embodiment of the invention shown in Figures 1 through 3 the first roll stand area is designated A, the hot-stretching area is designated B, and the second roll stand area is designated C. Each of these will be described at greater length hereinafter. For the present it should be noted that hot-stretching area B is divided into zones or stages D and E which are somewhat similar but which are not duplicates of each other. For convenience in describing the invention it will be assumed, for the present, that web W of textile fabric is in the heating phase in zone D and in the cooling phase in zone E. It is neither necessary nor desirable that the zones and phases coincide in this manner and ordinarily they will not coincide with each other. Thus the heating phase will in some instances be longer and in others shorter than the indicated length of zone D. Correspondingly, the cooling phase will be shorter or longer than the indicated length of zone E.

The web W may be any of the tensile reinforcing components employed in the rubber industry as in the manufacture of ply material for pneumatic tires, such, by way of example, as weak weft or weftless fabric commonly called cord fabric. It comprises a plurality of textile threads or cords arranged in parallel relation and slightly spaced from one another. The cords are continuous, or substantially so and much stronger and more closely spaced than any cross threads (also called weft, woof, or tie threads) that may be present. The web will have a width as desired for the particular installation or manufacturing process, that illustrated in the drawings having a nominal width of 60" and having approximately 1800 warp cords. The present invention is applicable to the conditioning of fabric materials of all kinds and types but is particularly suited to the synthetics of the thermoplastic type which require accurate control of any heating process to which they are subjected but which exhibit remarkable improvement in physical properties when the factors of time, temperature and tension are closely regulated and interrelated in the conditioning process. The individual cords may, by way of example, be nylon or Dacron and may each comprise 2, 4 or more plies twisted into a cable measuring approximately .021" or thereabouts in diameter. The cable may include approximately 840 individual filaments which are twisted, cabled and plied into a cord as per usual textile practice.

The web W enters the holding area A from a source at the left (not shown) such as a mill roll unwind stand and proceeds under low drawoff tension through sundry instrumentalities with which the present invention is not concerned and into a dip tank 10. This tank contains a liquid treating solution of conventional character with which the fabric is impregnated. The dips used may be water solutions of suspended latex, rubber or adhesive solids which when applied to the web and dried act as an adhesive medium to bind the ply rubber to the cord fabric.

In the case of thermoplastic textile fibers such as those mentioned, an inherent growth tendency which results from fiber elongation in use appears to be aggravated or increased by the dips used, for example, in the pneumatic tire industry to treat the cord fabric prior to calendering or coating with rubber to form the conventional reinforcing ply material. By use of the present process and apparatus the inherent elongation characteristics to the extent that they are objectionable can be eliminated from the thermoplastic cord materials. While most of the advantages of the invention can be realized with cord fabric materials that are not dipped or otherwise treated prior to stretching and heating, or are treated as by dipping and drying or partially drying in a separate operation, the present arrangement for dipping followed immediately as succeeding steps of a continuous process by tensioning, drying and heating has been found especially advantageous not only by reason of the simplicity and economy but because of benefits in maintaining closer regulation of the resulting elongation and other physical characteristics of the cord fabric material.

Dip tank 10 is attached to and underlies a roll stand 11 which among other things includes an upright framework incorporating a near side frame 12a and a far side frame 12b, the two being connected together by suitable cross members. Located in roll stand 11 above dip tank 10 is a group of superimposed squeeze rolls 13 which are constructed and arranged to operate in the usual fashion and over which web W proceeds in the usual way; i.e., counterclockwise over the lowermost roll, clockwise over the middle roll, and counterclockwise over the top roll.

The functions of these squeeze rolls include the holding or tensioning of the web and the removal by squeezing and wringing action developed by pressure of the web and the removal of excess dip solution from the fabric. The squeezed out liquid runs down over the rolls and into the dip tank 10 for reuse. The simultaneous tensioning action of the squeeze rolls is to snub or hold back the fabric without slippage against the tension that is impressed on the fabric by conventional tension control mechanism. To effect the desired holding or braking action on the web the squeeze rolls 13 are connected to a holdback generator 14 through suitable reduction gearing 14a, the arrangement being that of conventional regenerative braking. On leaving the top roll, web W travels to and over a web-tensioning idler 17 which is adjustably mounted on the top of the roll stand in such manner that its height above the squeeze rolls may be increased or decreased. From idler 17 the web proceeds to and under an idler 18 mounted as indicated in Figures 1 and 2 between side frames 12a and 12b on the forward end of the roll stand 11.

On the opposite or right-hand side of hot-stretching area B; i.e., in the roll stand area designated C, is a roll stand 21. The framework of the latter is constructed as shown in Figures 1 and 2 of a near side frame 22a, a far side frame 22b, and suitable cross members. Mounted between side frames 22a and 22b is a cluster of parallel idlers 23, 24 and 25, of which the first-mentioned and second-mentioned are so related to each other that their axes lie in a common horizontal plane. The third-mentioned idler, designated 25, is mounted between and above idlers 23 and 24 and is movable in a direction transverse to its own axis toward or from the common plane of the axes of idlers 23 and 24. Movement of idler 25 is controlled by a pair of pneumatic or hydraulically actuated power cylinders 26 and 27, of which the former is mounted on near side frame 22a and the latter on far side frame 22b.

Following the path indicated in Figure 2, web W then proceeds to the lowermost roll of a group of pull rolls 28 constructed and arranged to operate in conventional fashion. Web W proceeds counterclockwise over the lowermost roll, clockwise over the middle roll, counterclockwise over the top roll and thence to take-up mechanism (not shown) which may take the form of an accumulator, edge-aligner and take-up unit. Whereas the cluster of idlers designated 23, 24 and 25 requires no independent driving system, the rolls of the group of rolls 28 or one of them are positively driven by a motor 29 and reduction gearing 29a (Figure 1). The driving system includes conventional speed adjusting means providing a speed range of travel of web B of between about 3 and about 12 yards per minute at the wind up end, preferably about 7½ yards per minute with a tension of approximately 10,000 lbs. on a web of the character mentioned.

Tension on the web W is regulated by increasing or decreasing the driving torque applied to the pull rolls 28. The variable torque direct current motor 29 which drives the pull rolls and, through them, advances the web through the apparatus is governed in response to movement of the hydraulically loaded idler 25 in accordance with conventional control systems used for governing pull rolls. The movement of the idler 25 toward and away from the companion idlers 23 and 24 in maintaining the desired predetermined tension on the web is translated through suitable circuitry to vary the energy supplied to the pull roll drive motor. The holdback generator 14 and the pull roll motor 29 are electrically tied together through a speed control system which permits the operator to set the speed and tension at which the web W is advanced. Thereafter the web moves or advances automatically at the desired predetermined tension and speed.

In each of the two roll stand or holding and pulling areas A and C, respectively, the web W is securely gripped and by the cooperative action of the roll stands is placed under a certain amount of tension. The roll stand 21 applies a forward pull and roll stand 11 applies either a forward pull or a backward pull, as may be preferred or necessary. Between them, because of difference in roll speeds, the web is stretched in hot-stretching area B. The high tension on web W is evidenced, inter alia, by this stretching of the web, which actually elongates in hot-stretching area B. In the case of a web of nylon, of which the warp may have an initial extensibility of the order of about 10% to about 22%, usually about 16%, the elongation here produced may approach or equal the upper limit although a lesser degree of elongation, such as about 12% to about 16%, is usually preferred. This initial extensibility (which is not to be confused with the intrinsic elasticity of the nylon) is eliminated or taken up in hot-stretching area B, leaving the warp permanently elongated.

As will appear, web W is subjected in stretching area B to intensive heating (the heating phase) and then to drastic cooling (the cooling phase). The greater part of stretching area B is occupied by an oven 31 of the tunnel type. The top 1, bottom 2 and front or near 3 and rear or far 4 side walls of oven 31 are constructed of refractory insulating material: see Figure 3. Oven 31 is subdivided by a horizontal partition 32 and a vertical partition 34, both of insulating material, into a first upper chamber 35, a second upper chamber 36, a first lower chamber 37 and a second lower chamber 38. Chamber 37 is directly beneath chamber 33 and chamber 38 is directly beneath chamber 36. Thus chambers 35 and 37 are both in zone D; chambers 36 and 38, in zone E.

The web W follows a straight path through upper chambers 35 and 36, entering chamber 35 through a horizontal slot-like entrance or port 41 and leaving chamber 36 through a horizontal slot-like exit port 42. Between chambers 35 and 36 it passes through a horizontally extending opening or slot 34' in vertical partition 34. As indicated in Figure 2, web W makes but a single pass in traveling through oven 31. Consequently, the first portion of the path of the web, approximately half of the total path, is in zone D, while the second portion, the balance of the path of the web, is in zone E. The first portion is therefore in the heating phase; the second, in the cooling phase.

The path of travel of the web W through the oven 31 is flanked on both sides, here above and below, by suitable duct and jet protecting means which confines the web in the event of rupture. The energy stored in the tensioned web is thus prevented from wrecking havoc within the apparatus should it be suddenly released by severing or parting of the web. Figures 1–3 show the use of a steel walkway grating such as manufactured by Blaw-Knox of Pittsburgh, Pa., this grating comprising transversely extending parallel steel bars 45 and longitudinally extending parallel steel stringers 46. The bars and stringers are welded together at the crossing points and the ends of the bars are supported as on steel angles 30 (Fig. 3) fast to the near and far walls of the oven or heater 31. The walkway gratings are of advantage, in that they are strong enough to support the weight of an attendant, and the upper grating 43 is spaced a sufficient distance vertically above the lower grating 44 to permit the attendant to crawl between the gratings in inspecting and servicing the equipment.

Each of the two stretches of grating 43 and 44 is interrupted at intervals by nozzles or jet structures for the introduction of hot air into the chambers in the form of high velocity jets. The jet structures in the upper chamber in zone D, chamber 35, are designated 47. They are each substantially coextensive in width with the width of grating 43 and extend beyond both side edges of the web W. There are seven jets 47 each of which is subdivided by vanes 48 (Fig. 3) normal to the openings or orifices of the jets to minimize turbulence and direct the air in laminar fashion toward and against the web W. In communication with jets 47 are overlying supply ducts 49, one for each of the seven jets. Each of the jet structures 47 is formed of sheet metal and is in the nature of a short or stub tube of rectangular horizontal plan form or section, the long axis being transverse to the web path. One open end of the jet tube, here the upper end, is let into or registers with a matching opening in the bottom of the corresponding supply duct 49 to receive the hot air from the latter under pressure. The other open end of the jet tube, here the bottom end, is directed toward the web W and constitutes the jet outlet orifice. The vanes 48 for stabilizing the air flow in the jets occupy only portions, preferably portions adjacent the outlet orifices, of the spaces within the jet tube structures thus leaving clear chambers 47a, Fig. 2b, running the full length of the jet tubes within which are dampers 39 that permit or cut off the flow of air from supply ducts 49 to the jets 47.

These dampers 39 each comprise a pair of elongated cambered sheet metal strips disposed with their convex sides confronting one another and with their longitudinally extending parallel edges secured together. The strips enclose a longitudinally extending center rod 40 which projects through suitable journals at the ends of the elongated jet tube structures 47. The rods 40 or suitably coupled extension rods project through the near wall of the heater and carry operating levers 50 by means of which the dampers can be shifted between open and closed positions either manually or by suitable remotely controlled mechanism. Metal screens 59 (Fig. 2b) are desirably secured across the openings in the air entrance ends of the jet tubes to stabilize the flow, these screens being of about 1/16" to about 1/8" mesh stainless steel and welded or otherwise held in place.

Supply ducts 49 are closed at their near ends, seen in Figure 2. At their far ends supply ducts 49 project through the rear wall 4 of oven 31 as indicated in Figure 1. At such far ends, all seven of the supply ducts 49 are individually in open communication with a common supply manifold 51 on the back side of the apparatus. Supply manifold 51 is itself in communication through a large duct 52 with a hot air heater 53 equipped with a continuously operating motor driven blower (not shown) and a burner 54 using gas or oil as a fuel. Thus air heated to the desired temperature by burner 54 in heater 53 (about 350° F. to about 475° F.) is blown through large duct 52 to supply manifold 51 and thence through overlying supply ducts 49 to jets 47, by which it is discharged against the upper surface of web W in the manner indicated in Figure 3. The hot air serves to heat the web, and in the present instance, since the web is wet as a result of saturation by the dipping solution applied to it in dip tank 10, to dry it first.

The used air is returned to heater 53 through a large duct 55 by the fan or blower mentioned, through an exhaust manifold 56 located immediately above the top wall of oven 31, and through pick-up vent structures 57, of which there are six in the embodiment of the invention shown. Pick-up vents 57 are sheet metal open ended stub tubes like the air inlet jet structures 47 and extend across the oven from the near side to the far side thereof. They are each in open communication with common exhaust manifold 56. Thus, as indicated by the arrows in Figure 3, hot air is discharged from jet 47, deflected by web W, drawn through pick-up vents 57, collected by exhaust manifold 56, and carried off by large duct 55, which returns it to heater 53. The used air is re-circulated with a minimum loss of heat, making for more efficient operation of the apparatus. Control dampers (not shown) are provided in each of the vent tubes 57 and are similar in construction and operation to the dampers 39 to which they are preferably though not necessarily linked for operation in unison. That is, the control damper of each jet 47 is linked to the control damper of an adjacent vent 57 so that both such dampers operate in unison, both open or both closed.

Below lower grating 44 in upper chamber 35 is a second series of high-velocity jet structures 60, of which in the embodiment of the invention shown, there are seven, each opposing one of the seven upper jets 47 and being of similar construction to the latter, including dampers. Jets 60, which are provided for the purpose of supplying air at room temperatures ("cold air") are equipped at their upper ends with vanes 61 similar to the vanes 48 in the hot air jets 47. Like the jets 47, the jets 60 extend transversely across substantially the full width of the oven 31. Beneath and communicating with each of jets 60 is an underlying cold air supply duct 62 similar to the hot air supply ducts 49. Air flow through each of the jet structures 60 is controlled individually by a damper 39' like the dampers 39 previously described. The dampers 39' include rods 40' similar to the damper rods 40 and which project through the rear wall 3 of the oven to receive suitable actuating levers 50'. The jet structures 60 also include metal screens (not shown) similar to the screens 59 described in connection with the hot air jets 47 to stabilize the air flow into and through the jet structures.

In the situation that has been assumed, in which the heating phase happens to be co-extensive with zone D, all of the dampers 39' in the cold air jet structures 60 are in closed position and all of the dampers 39 in the hot air jet structures 47 are in open position. In the heating phase, except when the web comes to a complete halt, hot air is supplied to the exclusion of cold air; accordingly, the dampers 39' in cold air jets 60 are kept closed to preclude the pointless discharge of cold air against the web.

Like hot air supply ducts 49, cold air supply ducts 62 project through the far side wall 4 of oven 31 on the back side of the installation. Inasmuch as hot air ducts 49 overlie them, cold air ducts 62 cannot be seen in Figure 1. However, they are each in open communication with a common horizontally extending cold air supply manifold 63, located below manifold 51, on the back side of oven 31. Cold air supply manifold 63 is itself in communication, by means of large duct 64, with a motor driven air intake fan unit or assembly 68. This fan unit, located at the far end of large duct 64, blows air at atmospheric temperature into and through the large duct 64, supply manifold 63, supply ducts 62 and jets 60.

When the dampers 39' (Fig. 2c) in cold air supply jets 60 are in open position, cold air discharging from jets 60 impinges on the under side of web W as indicated by arrows in Figure 3. It is deflected by the web and, reversing its direction of flow, is exhausted from the first lower chamber 37 by means of cold air pick-up vents 67, of which there are six in the embodiment of the invention shown in Figures 1 to 3. These cold air pick-up vents are similar in construction to the hot air pick-up vents 57 and are provided with dampers desirably link connected to the dampers 39' of the cold air inlet jets 60 to open and close in unison with the latter. The vents are each let into and are in open communication with an underlying horizontally extending cold air exhaust manifold 66, which is common to the vents and is itself in communication with a large lateral duct 65 extending out the back of the oven to a suction fan assembly 69. The blower and suction fan assemblies 68 and 69 serve large ducts 64 and 65 simultaneously and are synchronized, the one forcing fresh relatively cool air into the system and the other discharging spent air from the system. The air discharged by way of the large duct 65 is, of course, drawn into cold air exhaust system through the cold air pick-up vents 67.

In zone E, which web W enters through an opening 34' in vertical partition 34, the web can be heated from the side opposite that from which it was heated in zone D, or the lower side thereof by hot air supplied as by means of upwardly directed high velocity jets 70 each extending laterally across substantially the entire width of the second upper chamber 36, underlying hot air supply ducts 71, hot air supply manifold 72, large duct 73 and a separate heater 74 provided with a motor driven air circulating blower (not shown) and a thermostatically controlled burner 75. The system for returning the hot air to heater 75 embraces a large hot air return duct 76, a hot air exhaust manifold 77 in the second lower chamber 38, and communicating hot air pick-up vents 78. The path of travel of the "used" air is through pick-up vents 78, exhaust manifold 77, and return duct 76. The jet structures, vents, dampers, stabilizing screens and related parts in zone E for the hot air system are substantially the same as their counterparts in zone D. However, in the situation that has been assumed in which web W is in the heating phase in zone D and in the cooling phase in zone E, the dampers (not shown) in underlying hot air supply jet structures 70 will be in their closed (normal) positions to preclude the entry of hot air. Cold air will in such case be supplied to web W on the upper surface thereof.

To make this possible, upper grating 43 is interrupted at intervals by high velocity cold air jet structures 80 communicating with overlying laterally extending cold air supply ducts 81 which project out through the rear side wall 4 of oven 31 as shown in Figure 1. Cold air supply ducts 81 are in communication with a common cold air supply manifold 82 on the back side of oven 31 which in turn is in communication with a large duct 83 at the far end of which is a motor driven blower fan assembly 68' for forcing fresh cool air into large duct 83.

A motor driven suction fan assembly 69' serves the exhaust system for spent air which has been used to cool web W, such system including a large duct 85, cold air exhaust manifold 86, and communicating cold air pick-up vents 87. The cold air system comprising jets, vents, ducts, manifolds, fans and related parts in zone E are substantially the same as their counterparts in zone D. Dampers for controlling the discharge of cold air from the jet structures 80 and the withdrawal of air through the vents 87 are similar to the dampers 39 and 39′ previously described and are preferably linked together for operation in unison. Thus in the situation that has been assumed, the web W, heated to a high temperature by the time it passes from zone D into zone E through opening 34′ in partition 34, is cooled rapidly in a setting or quenching action effected by the application of cold air through high velocity cold air jets 80. The latter are opposed by the high velocity hot air jets 70, provided as explained above for heating purposes. As already brought out, the dampers in underlying hot air jets 70 and hot air vents 78 are assumed, for present purposes, to be closed with no flow of hot air through hot air jets 70, while the dampers in the cold air jets 80 and cold air vents 87 are open.

Thus in the situation that is being described the web is heated from the top side in chamber 35 (zone D) and cooled from the top side in chamber 36 (zone E). However, in some circumstances, the first few cold air jets 80 (and their associated or adjacent vents 87) in chamber 36 may be cut off and the corresponding number of opposing hot air jets 70 (and associated vents 78) opened by the previously mentioned dampers. In this case, the heating phase of course extends from chamber 35 into chamber 36. The cooling phase is commensurately shorter. On the other hand, the last several hot air jets 47 (and adjacent vents 57) in chamber 35 may at times be shut off and, simultaneously, the last several cooling jets 60 (and adjacent vents 67) opened so as to discharge cold air against the underside of the web W. In such case, it is the heating phase that is shortened, the cooling phase being correspondingly lengthened.

This relative shortening of the heating phase and lengthening of the cooling phase, or vice versa, preferably is done by automatic control mechanism operating in response to the speed of web W in such manner as to increase the length of the heating phase and decrease the length of cooling phase as the rate of travel of the web decreases and to decrease the length of the heating phase and increase the length of the cooling phase as the rate of travel of the web increases.

The various heating jets 47 and cooling jets 60 preferably have their dampers 39 interconnected in reverse order by suitable linkage (not shown) so arranged that in each sub-zone comprising one or more heating jet structures, one or more cooling jet structures and their respective associated exhaust vents when the heating jet dampers are open, the cooling jet dampers are closed, and vice versa. There is a coincidental opening and closing of the corresponding heating and cooling exhaust vents or ports 57 and 67 by means of dampers (not shown) similar to and appropriately connected by linkage to the dampers 39 and 39′ for the gas or air inlet jets 47 and 60.

This damper opening and closing may be advantageously effected by the operation of a pneumatic piston cylinder assembly for each pair or group of dampers which assembly is operated through its stroke in either direction under the control of a suitable electrically operated three-way solenoid valve. The solenoids of the several valves are in turn controlled by voltage sensitive relays, one relay for each solenoid valve, interwired by suitable circuiting into the electrical system of the holdback 14 and pull motor 29. The various voltage sensitive relays are adjusted to operate each at a predetermined voltage corresponding to the speed of the fabric requiring hot (or cool) air exposure through the particular jet or group of jets being controlled. For example, when the fabric is running at the rated speed of the equipment all (or a predetermined number) of the hot air admitting and hot air withdrawing dampers are open and all (or a predetermined number) of the cold air admitting and cold air withdrawing dampers are closed. The main direct current generator output (and hence the entire electrical system including the voltage sensitive relays) is at a maximum voltage. As the operator adjusts the speed of the fabric downward he automatically reduces the voltage output of the main generator (and hence of the system). As the voltage decreases certain of the voltage sensitive relays close sequentially to operate the various air or pneumatic piston-cylinder assemblies closing the heating dampers and opening the cooling dampers in a cascading effect.

As previously pointed out, if web W slows down to a complete halt, it becomes necessary or at least highly desirable that heating of web W be discontinued and cooling of the web accomplished throughout oven 31. Accordingly, in the event of an emergency or dynamic stopping, all relays open in fast succession in proportion to the stopping speed of the web and the main generator output. In starting up the reverse of stopping takes place in that the piston-cylinder assemblies operate to close the cooling jets and open the heating jets in an ascending cascade. Likewise, an increase in speed causes more heating jets to open and cooling jets to close in predetermined relation to one another and to the speed. The present invention thus contemplates overriding controls by which, in the event of stoppage of web W, all of the open dampers in the heating phase are immediately caused to close. At the same time, all of the closed dampers blocking flow of cold air through the cooling jets are immediately caused to open. In such circumstances, whether the end of the heating phase otherwise would fall short of partition 34, coincide with it or extend beyond it, all of the hot air jets in the heating phase are caused to close. The opposed cold air jets are caused to open. Thus in a matter of a few seconds there is a change of atmosphere with an attendant reduction in temperature of the web which will keep the stationary web from deteriorating under what would otherwise be the application of air heated to an excessively high temperature.

In the description of the system of the present invention the treatment of the fabric web W has included the immersion of the web in the dip solution contained in the tank 10 followed immediately in continuous fashion by progressive heating of the web. The continuous heating operation first effects drying by evaporation of the water or other vehicle used in the dip and then heat treating of the web while tensioned to effect the desired stretching. It is, of course, feasible to employ the hot stretch features entirely apart from the dipping. In such case the fabric may be dipped and dried or otherwise treated in a prior separate and independent operation. Then, in a dry condition the web is introduced into the present apparatus (omitting dip in the tank 10) and passed through the oven 31 under tension provided by the squeeze rolls in the zone A and the main pull rolls in zone C. In the case of fabric which has to be processed into rubberized ply material without preliminary dipping or other chemical application it is contemplated, of course, to utilize the system of the present invention to effect heat stretch. The fabric material in such case is subjected to this heat stretch treatment as received in rolls untreated directly from the mill.

To insure delivery of hot air through the jets onto the traveling web W at a predetermined temperature the heaters 53 and 74 in the embodiment of Figs. 1–3 and the heaters 164 and 164′ in the case of the embodiment of Figs. 4–7 may be set thermostatically to deliver air to the high velocity jet nozzles at a temperature slightly below that desired for treating the web W. In passing through the jet structures the air is then elevated in temperature, if necessary, as by electrical resistance heaters 90 each of which may take the form of an elongated bar or rod such as known commercially as Calrod. These heater rods are individually controlled thermostatically so as to heat the air discharged from each of the high velocity jets precisely to the temperature desired. By reason of such individual control it is feasible, of course, to supply air heated to different temperatures at the different sub-zones. In most instances, however, the arrangement of distributed individual heaters will be most effective because of the ability of the system to deliver air at the desired temperature to different portions of the web path no matter how distant from the main heater.

In the embodiment of the invention shown in Figures 4 to 7, there are as before spaced holding and pulling roll areas and an intervening hot stretching area. The holding and pulling roll areas are designated A' and C'. The hot stretching area, designated B', may be considered as breaking down into zones D', E', F' and G' (Figure 5). The arrangement is such that web W makes three passes in its travel through the hot-stretching area, the first pass in a forward direction through zones D' and E', the second in a rearward direction through zones F' and G', and the third in a forward direction in an elongated chamber underlying zones F' and G'. In such chamber, the web W is in its cooling phase, as perhaps also in one or more of the zones which immediately precede it; in the other such zones, beginning with zone D', the web is in its heating phase.

Holding roll area A', in which web W is subjected in dip tank 110 to a conventional dipping operation of the kind already described, consists mainly of a roll stand 111 made up of side frames 112a and 112b, together with appropriate cross members. Between side frames 112a and 112b is a first group of squeeze rolls 113 of conventional construction and arrangement, such squeeze rolls being driven by a motor 114 and reduction gearing 114a. Similarly mounted between side frames 112a and 112b is a second group of squeeze rolls 115 driven by a motor 116 and reduction gearing 116a. Web W, which enters roll stand 111 from the left, proceeds first to dip tank 110, then to squeeze rolls 113, then to squeeze rolls 15 and then over idlers 117 and 118 to the near end of hot stretching area B'. The arrangement of the squeeze rolls 113 in tandem with the squeeze rolls 115, each group being driven by a separate motor, permits a preliminary cold stretching of the fabric web to be effected while it is wetted by the dip solution, this being advantageous with certain materials. The amount of such preliminary cold stretching can be varied as desired, the electrical controls governing the supply of energy to the direct current motors 114 and 116 being adjustable to vary the speed ratios of the two squeeze roll groups.

Leaving the hot stretching area at the far (right hand) end thereof and entering pulling roll area C', which consists mainly of a roll stand 121 made up of side frames 122a and 122b and suitable cross members, the web W is engaged almost at once by a cluster of parallel idlers 123, 124, and 125, of which the last mentioned is adjustable transversely to its own axis in a direction toward or away from the common horizontal plane of the axes of idlers 123 and 124. Idlers 123, 124 and 125 are similar in construction, arrangement and function to idlers 23, 24 and 25 in the previously described embodiment of the invention. Movement of adjustable idler 125 is effected by means of power cylinders 126 and 127 on side frames 122a and 122b, respectively. Through appropriate tie-in between the electrical circuit of the holding roll generator, the pulling roll motor (to be later mentioned) and suitable electrical controls such as limit switches sensitive to the position of the idler 125 or to the fluid pressure motors in power cylinders 126 and 127 the system is capable of automatically maintaining a substantially constant predetermined tension on the advancing web W.

From idlers 123, 124 and 125, web W proceeds as indicated in Figure 5 to the lowermost roll of a group of superimposed pull rolls 128. The latter may be of conventional construction and conventionally arranged. They are driven by a motor 129 and reduction gearing 129a (Figure 4). Means are provided for adjusting the speed and torque so that the rate of travel of web W may be varied between limits of about 3 and about 12 yards per minute with the tension on the web varied between about 10,000 and about 20,000 lbs., that is, from about 5 pounds per cord to about 10 pounds per cord as required. Normally, an average rate of travel of about 7½ yards per minute and a tension of the order of 10,000 lbs. is desired with a weftless or weak weft textile fabric of nylon of 60" width having a count of about 30 ends per inch (840/2 to 840/4), this being the web example mentioned above in connection with Figs. 1–3. On the other hand, with a textile fabric of polyester resin of similar construction, in which the yarn will ordinarily be of twice the denier, a tension of approximately 20,000 lbs. is desired at the same average rate of travel.

In the hot-stretching area B', in which a drastic elongating action is exerted on web W as a result of suitable differences in the effective peripheral speeds of the rolls in roll stands 111 and 121, the web is subjected first to heating and then to coling. As in the case of the oven 31 in the previously described embodiment of the invention, oven 131 is constructed of insulating material. It is divided by vertically spaced parallel horizontal partitions 132 and 133 and a centrally located vertical partition 134 into a series of chambers four of which form part of zones D', E', F', and G'. The fifth, built up as are the other enclosing parts of the oven of refractory insulating material of the type commonly employed in heat treating furnaces, is the elongated chamber referred to as underlying zones F' and G'.

As is apparent from Figure 5, chamber 135 lies above horizontal partition 132 and to the left of vertical partition 134. Together with its appurtenances, it is in zone D', which corresponds to zone D in Figures 1 and 2. Chamber 136 lies above horizontal partition 132 and to the right of vertical partition 134. In general, it is in zone E', which corresponds to zone E of Figures 1 and 2. Chamber 137, which lies to the right of vertical partition 134 between horizontal partitions 132 and 133, forms part of zone F'. Chamber 138, which lies to the left of vertical partition 134 and between horizontal partitions 132 and 133, forms part of zone G'. Not included in any of the above mentioned zones is the elongated chamber 139, which has no counterpart in the previously described embodiment of the invention.

Oven 131 is provided as shown in Figure 5 with a horizontally elongated slot-like entrance 141 for web W. The latter travels to the right the length of chamber 135, thence through an opening 134' in partition 134 into chamber 136, and thence through chamber 136, all in a straigth horizontal path. Leaving chamber 136 through a horizontally elongated slot-like exit 142, the web then proceeds in a direction changing reverse bend as shown in Figure 5 over two steam-heated idlers 143 and 144 arranged one above the other and suitably supported in a rigid frame (not shown). After leaving them, it enters chamber 137 through a horizontally elongated slot entrance 145. It proceeds in a straight horizontal path from chamber 137 to chamber 138 through a second horizontally elongated slot opening 134" in partition 134, emerging from chamber 138 through horizontally elongated slot exit 146. It then passes in another direction changing reverse bend over two water-cooled idlers 147 and 148 mounted as shown in Figure 5 on roll stand 111 and, after leaving idler 148, again enters oven 131 through a horizontally elongated slot entrance 149. In doing so, it traverses the length of chamber 139 as indicated in Figure 5 to a horizontally elongated slot exit 150, proceeding thence to roll stand 121 as already described.

Thus the path of travel of web W is characterized by three passes through oven 131 one above another. The first pass is from left to right as seen in Figure 5, the second from right to left, and the third from left to right, i.e., in the original direction. The first pass is characterized by a first portion in which the path of travel is in zone D' and a second portion in which the path of travel is in zone E'. The second pass is characterized by a first portion in which the path of travel is in zone F' and a second portion in which it is in zone G'. In the third pass, from left to right as seen in Figure 5, the path of travel is entirely in chamber 139.

In chamber 139, web W is cooled, either naturally as by ambient convection currents of air or by forced cooling; accordingly, this portion of the path of travel of web W is always in the cooling phase. Normally one or more of the zones through which the web travels before reaching chamber 139; e.g., chamber 138 in zone G', is also used for cooling purposes. If so, web W is in the cooling phase as it passes from right to left through chamber 138 in zone G'. The same holds true also as to chamber 137 in zone F'. Prior travel of the web through chamber 135 in zone D' and chamber 136 in zone E' (possibly also travel through chamber 137 in zone F') is characterized by application of heated air to the web; accordingly, in these zones, the web W is in the heating phase.

Thus the heating phase may embrace two, three or four of the several zones D', E', G' and F'. The cooling phase, on the other hand, may embrace none of them, one of them (zone F'), two of them (zones F' and G') and seldom, if ever, zone E' except when, as in case of web stoppage, immediate cooling of the entire web portion within the oven becomes imperative.

The path of travel of web W through zones D' and E' is flanked by upper and lower panels 151 and 152, respectively, of insulating material such as metal clad refractory material of the type comprising 20 ga. sheet metal on both sides of magnesia block like boiler lagging. Similarly, the path of travel of the web through zones F' and G' is flanked by like upper and lower insulating panels 153 and 154, respectively. The insulating panels 151, 152, 153 and 154 serve to prevent damage to the other parts of the installation in the event that the web parts at a splice or breaks when subjected to tensile stresses which it is intrinsically incapable of withstanding. The energy release at the instant of separation is very great and great damage can be done to the interior of the installation if provision is not made for flanking the path of travel of the web in some such manner as that described.

Insulating panels 151 and 152 are respectively characterized by square openings 155 and 156 along the edges thereof which adjoin near side wall 103 of oven 131 as seen in Figure 4. They are characterized also by similar openings 157 and 158 (Fig. 7) along the edges thereof which adjoin far side wall 104 of the oven. Openings 155 and 156 appear in Figures 5 and 6 in consequence of the fact that the view line (shown in Figure 4) passes through them. Thus insulating panels 151 and 152 are ported, as described, in portions thereof which do not immediately overlie or underlie the web W. They are solid or imperforate immediately above and immditaely below the web.

In that portion of the chamber 135 located above upper insulating panel 151; i.e., sub-chamber 135a, is a system similar to that described in connection with the embodiment of Figs. 1–3 for supplying hot air to the web W. This system includes ten high velocity hot air jets 161, best seen in Figure 6, which are controlled by dampers (not shown) similar to the dampers 39 previously described and similarly controlled, the jets being otherwise in open communication with an overlying hot air supply manifold 162. The latter receives hot air from heater 164 (seen in plan in Figure 4) through a large duct 163. The hot air supplied by heater 164, which latter includes a motor driven air circulating fan or blower, travels in sequence through duct 163, manifold 162 and jets 161, passing from the latter at high velocity into impinging contact with and against the upper face of the web W as indicated by the arrows in Figure 6. The air flows laterally across the face of the advancing web toward and to square ports 155 and 157 located along the edges of the upper insulating panel 151, through which ports the air escapes into sub-chamber 135a which is that portion of chamber 135 which is located above the web and which surrounds hot air supply manifold 162. Return ducts 165 and 166 which are extended into the sub-chamber 135a at its ends and large duct 167 common to 165 and 166 carry the used air back to the heater 164 for reheating, if necessary, and recirculation.

Desirably the return ducts 165 and 166 (as well as 175 and 176 later described in connection with the cold air system) extend into the chambers of the oven 131 through the rear wall 104 (see Fig. 7) and also extend across the width of the oven chambers. The sides of these ducts, within the oven chambers, are formed with ports 170 distributed across the width of the particular chamber in which the duct extension is located, these distributed ports constituting spaced entrances into the ducts through which the spent or returning air flows into the ducts. Thus is obtained an even distribution of flow through the oven chambers and over the web W.

In the sub-chamber 135b, which underlies the web and the lower insulating panel 152, provision is made for supplying air at atmospheric temperatures ("cold air") when required to prevent overheating of the web W. In general, this system is similar to that employed for supplying hot air to the sub-chamber 135a. There are ten high-velocity cold air jets 171 controlled by dampers, as in the cases of the cold air jets 60 and 80 previously described, each of which cold air jets is in communication with as by being let into a cold air supply manifold 172 to which air at normal atmospheric or room temperatures of from about 60° F. to about 80° F. is supplied through supply duct 173 (Figure 4). The latter duct and also companion sheet metal cold air return ducts 175 and 176 are served by a common electric motor driven fan assembly indicated at 179. The ducts 175 and 176 are similar in plan form to the hot air return ducts 165 and 166 which they respectively underlie and are connected to the suction side of the return fan of the fan assembly 179 as by a duct 177. A similar duct system is illustrated in connection with zone E' wherein the corresponding parts are identified by the same numerals primed. This fan assembly draws in fresh atmospheric air from the room or building in which the apparatus is located, or from outside the building through a suitable duct, and discharges, into the room or through a duct to the outside, the spent or circulated air returned from the web through the ducts 175', 176', and 177'. As in the case of the embodiment of the invention shown in Figures 1 through 3, the dampers in the hot and cold air supply jet structures 161 and 171 are so controlled that the cooling system in sub-chamber 135b is non-operative when the heating system in chamber 135a is in operation.

If it be assumed for the present that the heating phase extends through the zones D' and E', chambers 135 and 136 and their contents may be similarly constructed and arranged although it is preferable, as shown, to arrange the chamber 136 as the inverse of the chamber 135 like the chamber 36 in the embodiment of Figs. 1–3 is the inverse of the chamber 35. To avoid repetition the parts of the system associated with or contained in the chamber 136 are identified by the same numerals of reference as the corresponding parts associated with the chamber 135, except that the numerals for the parts in and associated with the chamber 136 are primed. In the inverse arrangement, hot air, derived from the heater 164' through suitable ducting of sheet metal, will be supplied in chamber 136 from the sub-chamber below lower insulating panel 152; i.e., sub-chamber 136a. Therefore, as seen from above in Figure 4, the cooling apparatus in zone E' will appear above the heating apparatus. This cool air circulating system includes a combined suction fan and blower assembly 179' driven continuously by a common electric motor. As in the previously described embodiment of the invention, the cooling system runs but has closed dampers to withhold the air from the web so long as the heating system is in operation; accordingly, if the heating is as assumed, web W is heated from above in zone D' and from below in zone E'.

If, however, the heating phase continues beyond zone E' into zone F', heat will be supplied to the web by means of a like system of jets, supply ducts, etc. in lower sub-chamber 137b of chamber 137, which is opposed in upper sub-chamber 137a by a cooling system of jets, supply ducts, etc. Here, again to avoid repetition, the numerals identifying the parts of the system associated with the chamber 137 are double primed, but are otherwise the same as the numerals employed to identify similar or corresponding parts associated with the chambers 135 and 136. It will be noted that the top surface of the web W in the pass which the web makes through zones D' and E' becomes the bottom surface of the web in the return pass through zones F' and G'. Consequently, to heat the web first from one side and then from the other, as is done pursuant to the invention, it is necessary to equip chamber 137 similarly to chamber 136; that is to say, with the cooling system above the path of travel of the web and the heating system below it. Thus the chambers 136 and 137 are similarly equipped in the sense that the cooling equipment is in the upper sub-chamber and the heating equipment in the lower.

In zone G', which as a general rule is likely to be in the cooling phase, similar reasons lead to arrangement of the heating and cooling systems in chamber 138 just as they are arranged in overlying chamber 135. In other words, the heating system is above in sub-chamber 138a and the cooling system is below in sub-chamber 138b. Thus if, as a result of a very slow rate of travel of the web W through oven 131, the heating phase happens to continue through zones D', E' and F' and into zone G', heat will be supplied in upper sub-chamber 138a to what is then the top face of the web. The directly opposing jets in lower sub-chamber 138b, which are equipped to supply cold air to the web, are of course non-operative under such circumstances. In chamber 138 the parts are identified by triple primed numerals which otherwise are the same as the numerals applied to corresponding parts in the chambers 135, 136 and 137.

The heating phase will ordinarily terminate somewhere in chamber 138 in zone G' if it has not already terminated in chamber 137 in zone F'. In such case one or both of chambers 137 and 138 will be supplying cold air to the web for the purpose of effecting a quick reduction in its temperature. This is done through the appropriate jets and supply ducts. In such case, the jets for supplying hot air in the same chamber or chambers which oppose the cold air jets that are currently in operation will of course be non-operative. Thus, in ordinary circumstances, the web will be in the cooling phase in at least part of the return pass through zones F' and G'.

In the elongated chamber 139 which underlies zones F' and G', no provision is made for heating the web. Chamber 139 is never in the heating phase but always in the cooling phase, which, as previously indicated, can readily extend back through chambers G' and F' and, in some circumstances, even into zone E'. In many cases, therefore, no special provision needs to be made for the cooling of the web in chamber 139, the cooling being permitted to take place naturally; however, it will sometimes be desirable to provide means for effecting the forced cooling of the web as it travels through chamber 139, this to insure reduction of the temperature of the web, particularly if traveling at a high rate of speed, to levels approaching room temperatures. In such cases, ducts and power driven fans similar to those previously mentioned for supplying and removing cold air may be added to chamber 129.

As in the embodiment of the invention illustrated in Figures 1 to 3, controls are provided in or on the oven 131 by which to actuate the appropriate dampers sequentially in the cascading arrangement described to increase the over-all length of the heating phase as the speed of travel of the web is increased. There is, however, always a possibility that travel of the web will halt due to stoppage of a calender or some other take-up unit to which the web is fed as or after it leaves roll stand 121. Therefore, as in the embodiment of the invention illustrated in Figures 1 to 3, provision is also made to render all of the heating jets non-operative as soon as the web stops moving and at the same time to bring into operation all of the cooling jets, regardless of zone. An over-riding control system is therefore provided so that, upon web stoppage, the flow of hot air will be immediately interrupted and such hot air as is present in the various chambers in zones D', E', and F' and G' will be promptly exhausted and replaced by cold air. At the same time, cooling air is supplied to all of the various chambers of the oven, the system of cold air supply jets and supply ducts being open and operative to the exclusion of the hot air supply jets and supply ducts.

In constructing the ovens 31 and 131 conventional materials and procedures known to the heating and ventilating arts are used. The walls, partitions and roofs of the ovens are made of standard refractory bricks and blocks, say of magnesia, there being provided suitable supporting elements such as steel bars, rods and appropriate rolled sections connected together into a framework as is well known in building kilns, heat treat ovens and the like.

The various ducts such as the hot and cold air supply and return manifolds and conduits 49, 51, 52, 55, 56, 62–66, 71–73, 76, 77, 81–83, 85, 86, 162, 163, 165–167, 172, 173 and 175–177, and the hot and cold jet and vent structures 47, 60, 57, 67, 161, 171, etc. are fabricated of sheet metal, the portions of the ducts that are outside of the ovens and that are to carry hot air, being suitably insulated as by asbestos coverings.

As a further refinement of the heating process and as a modification of the arrangement described in connection with Fig. 2b wherein the electrical resistance heating rod 90 is employed as a booster to bring the air to the desired fabric treating temperature, it is contemplated to employ a multiplicity of such electrical heating elements suitably disposed to heat the traveling web by direct radiation. Such radiant heating of the traveling web may be employed in lieu of, or merely to supplement the web heating by hot air. In the combination arrangement the radiant heaters, such for example as the elongated Calrod elements mentioned, may be supported by their ends in the outlet openings of the jet structures 47 (or 70 in the case of heating zone E, or 161 in the case of the embodiment of the invention illustrated in Figs. 4–7) the air stabilizing vanes 48 or equivalent, being suitably notched or recessed to accommodate the elongated rod electrical heating elements. As a variation of this aspect of the invention certain of the radiant heating rods may be disposed within the oven chambers, preferably behind the protective metal grilles 43 (or the stretched piano wire device) so as to prevent contact of the web against such electrical heating elements.

The control of the electrical radiant heaters is effected automatically as by thermocouples disposed intermediate the heaters and the traveling web so as to maintain the web sub-zones at desired predetermined local temperatures. As in the case of the automatic operation of the control dampers governing the flow of the hot and cold air, a tie-in is effected electrically to provide for de-energization of the electrical heating elements instantly upon stoppage of the web and to provide also for the instant opening of the cooling air dampers upon web stoppage to cool the web and prevent overheating as by any residual heat remaining in the radiant heaters after deenergization. In the radiant heating system the several radiant heaters distributed along the length of the web path are individually controlled by suitable voltage sensitive relays to provide the ascending and descending cascade effect incident to increasing and decreasing fabric web speeds. As a variation of this control aspect concerned with the radiant electrical heaters, it is further contemplated that in lieu of the ascending and descending cascade arrangement the thermostatic controls may be arranged to vary the energy supplied to the radiant heaters in the obtaining of an increase in radiant energy upon an increase in fabric web speed and the obtaining of a decrease in radiant energy upon a decrease in fabric web speed.

Thus the invention includes, among other things, a hot stretch system for a continuously traveling web of textile fabric of a synthetic resin such as nylon, polyester resin or the like in which the warp threads are tensioned by means of roll stands at the two ends of the installation and, between them, by stretching in an intervening area in which the temperature of the thread is raised so stretch-elimination can be accomplished while the web is heated to a relatively high temperature. In order that the latter shall not be too long maintained, provision is made for subjecting the web to rapid cooling at the end of the heating phase and in any case if travel of the web comes to a halt.

The invention provides a process for treating thermoplastic synthetic textile fabrics to effect permanent rearrangement of the molecular structures of the fibers comprising the fabrics and thereby increase their tensile strengths and reduce the stretch under load of the fabrics.

In utilizing the apparatus of the present invention in treating fabric material the best mode of practicing the process, briefly reviewed, thus contemplates stretching the material in the form of the web W between the spaced support rolls, 18, 23 in the embodiment of Figs. 1–3 and 118, 143, 144, 147, 148 and 123 in the embodiment of Figs. 4–7. A plurality of hot gaseous jets from the nozzles 47 are directed simultaneously to impinge against the stretched web of fabric material, the material being unsupported in the gas impingement areas. In one portion or zone of its path ahead of the rollers mentioned, the web is tensioned by the rolls of the pull stand and a liquid treating agent is applied continuously to the advancing fabric as its drawn through the dip tank in such one portion of its path. While the wetted fabric is advancing it is tensioned and while under tension the wetted fabric is heated by impingement of the hot air jets in another zone or path portion and predetermined elongation is effected therein. Thereafter, the web is cooled while under tension to set the elongation. A predetermined tension is maintained on the fabric web as it passes through the dip and a predetermined tension is also maintained on the web in the heating zone the web tension in the heating zone being maintained independently of the web tension in the dip. Thus while the textile fabric is in the form of a traveling web it is heated and cooled stepwise while being hot stretched, the dipped web advancing through a plurality of heating zones seriatim and the sequence of steps being heating from one side, heating from the other side, and cooling, in that order. Moreover, the present invention contemplates and the apparatus provides for subjecting the advancing web to different predetermined temperatures in the several heating zones.

It is self-evident that in the various units making up the installation, including the heating and cooling systems, changes may be made without departing from the spirit of the invention. Numerous modifications and alterations of parts are contemplated, the particular embodiments of the invention shown and described and the particular procedures, methods and process steps set forth being given merely for purposes of explanation and illustration without intending to limit the patent to the details disclosed.

It is intended that the patent shall cover, by summarization in appended claims, all features of patentable novelty residing in the invention. What I claim and desire to secure by letters patent of the United States is:

1. Apparatus for continuously conditioning a textile fabric web comprising means for advancing the web under tension over a path which includes a succession of zones each of relatively small extent in the direction of web advancement, means for supplying and impinging hot gas against the advancing web in the form of individual jets at a plurality of the zones, means for supplying and impinging cold gas against the advancing web in the form of individual jets at a plurality of the zones, each cold gas zone being opposite a companion hot gas zone and separated therefrom solely by the advancing web and valve means individually controlling the gas supplying and impinging means at each of the zones whereby the number of zones at which hot gas is supplied can be varied relative to the number of zones at which cold gas is supplied.

2. Apparatus for continuously conditioning a textile fabric web comprising means for advancing the web under tension over a path which includes a succession of zones each of relatively small extent in the direction of web advancement, common heater means for supplying and individual jet means for impinging hot gases against the advancing web at a plurality of the zones, common fan means for supplying and individual jet means for impinging cold gas against the advancing web at a plurality of the zones, each cold gas zone being opposite a companion hot gas zone and separated therefrom solely by the advancing web and separate valve means associated with each of the several individual hot gas and cold gas jet means for controlling the impingement of the hot and cold gases on the web in the several zones whereby the number of zones at which hot gas is supplied can be varied relative to the number of zones at which cold gas is supplied.

3. Apparatus for conditioning a textile web comprising spaced rolls arranged to stretch and support the web in a straight run and between which the web travels under tension, and, in the space between the rolls, a plurality of hot and cold gas supply instrumentalities distributed along the path of the web run, each instrumentality being arranged to supply hot gas to one side and cold gas to the other side of the web, the instrumentalities being so constructed that a succeeding instrumentality in the direction of web travel is adapted to supply cold gas to that side of the web to which the preceding instrumentality is adapted to supply hot gas, and is adapted to supply hot gas to that side of the web to which such preceding instrumentality is adapted to supply cold gas.

4. Apparatus for continuously conditioning a textile web comprising means for advancing the web under tension over a path which includes a succession of zones each of relatively small extent in the direction of web travel, means for supplying and impinging gaseous jets against opposite sides of the advancing web at a plurality of the zones, the gas supplying means being arranged so that the jets on one side of the web are hot and directed oppositely to the jets on the other side of the web which latter jets are cold, and dampers controlling the individual jets on both sides of the web.

5. Apparatus for conditioning a textile web comprising an oven structure, spaced rolls arranged to stretch and support the web in a straight run through the oven and between which the web travels under tension and wholly self-supporting, a stationary foraminous protective barrier paralleling the web run in closely spaced non-contacting relation, a plurality of nozzles arranged to direct hot gas through the barrier to impinge directly on the travelling web, means supporting the barrier in the oven structure independently of the nozzles, each nozzle projecting through the foraminous barrier and having a gas emission orifice transverse to the web travel direction, and means for supplying hot gas to the nozzles and recirculating such gas.

6. Apparatus for conditioning a textile web comprising an oven structure, spaced rolls arranged to stretch and support the web in a straight run through the oven and between which the web travels under tension and wholly self-supporting, a protective barrier paralleling the web run in closely spaced non-contacting relation, said barrier comprising a stationary foraminous metal structure, a plurality of nozzles arranged to direct hot gas through the barrier to impinge directly on the travelling web, means supporting the barrier in the oven structure independently of the nozzles, each nozzle projecting through the foraminous barrier and having an elongated gas emission orifice disposed with its long dimension transverse to the web travel direction, and means for supplying hot gas to the nozzles and recirculating such gas.

7. Apparatus for conditioning a textile web comprising spaced rolls arranged to stretch and support the web in a straight run and between which the web travels under tension, a pair of confronting protective barriers disposed one on each side of the web run in parallel closely spaced relation thereto, a plurality of nozzles arranged to direct gas jets through the barriers to impinge directly on the travelling web, each nozzle having an elongated gas emission orifice disposed with its long dimension transverse to the web travel direction, means for supplying hot gas to a group of the nozzles on one side of the web run, and means for supplying cold gas to a group of the nozzles on the other side of the web run.

8. Apparatus for conditioning a continuous strip of textile material comprising means for continuously advancing a run of the strip lengthwise and under tension over a rectilinear path, said means including spaced support means engaging such a strip at the ends of the path, the run of an advancing strip being unsupported along the length of the path between said ends, a heater structure enclosing said path, guard means carried by the heater structure and disposed along the length of the path in closely spaced generally parallel flanking relation to an advancing strip, the heater structure including ducts separated from an advancing strip by the guard means and nozzles terminating such ducts and spaced along the length of said path for directing jets of a fluid heating medium against an advancing strip, the guard means being interrupted at intervals corresponding to the spacing of the nozzles, and the nozzles being located at the interruptions whereby the guard means without interfering with the jets protects the nozzles and ducts against damage in the event of strip breakage.

9. Apparatus for conditioning a continuous strip of textile material comprising means for continuously advancing a run of the strip lengthwise and under tension over a rectilinear path, said means including spaced support means engaging such a strip at the ends of the path, the run of an advancing strip being unsupported along the length of the path between said ends, a heater structure enclosing said path, guard means carried by the heater structure and disposed on opposite sides and along the length of the path in closely spaced generally parallel confronting relation to one another and in flanking relation to such a strip, said guard means defining a clear passage for the unsupported run of such a strip whereby to confine the material of such strip to the passage between the flanking guard means in the event such strip breaks while advancing over said path, the heater structure including ducts outside said strip passage and nozzles terminating such ducts for directing jets of a fluid heating medium against an advancing strip, said nozzles being spaced along the length of said path, and the guard means being interrupted at intervals corresponding to the spacing of the nozzles to accommodate the fluid jets.

10. Apparatus for conditioning a continuous strip of textile material comprising means for continuously advancing a run of the strip lengthwise and under tension over a rectilinear path, said means including spaced support means engaging such a strip at the ends of the path, the run of an advancing strip being unsupported along the length of the path between said ends, a heater structure enclosing said path, the heater structure including a plurality of ducts terminating in nozzles spaced along the path of an advancing strip and arranged to direct gas jets to impinge directly on an advancing strip, each nozzle having an elongated gas emission orifice disposed with its long dimension transverse to the strip path, and metal gratings carried by the heater structure in generally parallel closely spaced relation to the advancing strip, such gratings being disposed in the spaces between the gas nozzles and constituting a foraminous guard barrier, protecting the ducts and nozzles against damage by the breakage of an advancing strip while providing openings for the exit of gas from the space between the gratings and an advancing strip.

11. Apparatus for conditioning a continuous strip of textile material comprising means for continuously advancing a run of the strip lengthwise and under tension over a rectilinear path, said means including spaced support means engaging such a strip at the ends of the path, the run of an advancing strip being unsupported along the length of the path between said ends, a heater structure enclosing said path, the heater structure including a plurality of ducts terminating in nozzles spaced along the path of an advancing strip and arranged to direct gas jets to impinge directly on an advancing strip, each nozzle having an elongated gas emission orifice disposed with its long dimension transverse to the strip path, and insulating panels carried by the heater structure in generally parallel closely spaced relation to the advancing strip, said panels being disposed in the spaces between the gas nozzles and constituting both a heat and a guard barrier to confine the heat of impinging gas to the space between the web and such panels and to protect the ducts and nozzles against damage by the breakage of an advancing strip.

12. Apparatus for conditioning a continuous strip of textile material comprising means for continuously advancing a run of the strip lengthwise and under tension over a rectilinear path, said means including spaced support means engaging such a strip at the ends of the path, the run of an advancing strip being unsupported along the length of the path between said ends, a heater structure enclosing said path, said structure comprising a casing, supply headers extending along one side of the casing, a plurality of hot gas supply ducts extending laterally from one of the headers into the casing from said one side of the latter and disposed in a bank generally parallel relative to one another, a plurality of cold gas supply ducts similarly extending into the casing from another of the headers and similarly disposed and related, each duct being closed at one of its ends and at its other end being open to and continuous with the header from which it extends, the ducts of one bank being spaced along the length of the strip path on one side of the latter, the ducts of the other bank being spaced along the length of the strip path on the other side of the latter, each duct being transverse to such path and having a nozzle formed with discharge orifice means elongated across the width of the strip path and arranged to direct a gas conditioning medium as received from its respective duct and header into the casing and directly onto an advancing strip, hot and cold gas return headers generally paralleling the strip path in spaced relation, a plurality of return ducts extending laterally from each return header into the space between the corresponding return header and the strip path, the return ducts from the hot gas return header alternating with and extending between the hot gas supply ducts and the return ducts from the cold gas return header alternating with and extending between the cold gas supply ducts, each return duct having a vent paralleling the discharge orifice means of the adjacent and corresponding supply ducts and opening toward the strip path to receive spent conditioning gas, hot gas blower means located outside the casing on said one side of the latter and connected to one of the hot gas headers for inducing a flow of hot gas into the casing through the hot gas supply ducts and nozzles and out of the casing through the hot gas return vents and ducts, and cold gas blower means similarly located and connected to one of the cold gas headers for similarly inducing a flow of cold gas into and out of the casing through the cold gas ducts, nozzles and vents.

13. Apparatus for conditioning a continuous strip of textile material comprising means for supporting and continuously advancing the strip lengthwise and under tension over a predetermined path, a heater structure enclosing such an advancing strip, the interior of the heater structure being divided into companion chambers by the strip, the enclosed strip being wholly self-supporting and free of contact with the heater structure through the chambers by reason of the tension maintained by the advancing means, means for supplying temperature conditioned primary gas to and withdrawing such primary gas from one of the chambers, means for supplying secondary gas to and withdrawing such secondary gas from the companion chamber which is divided from said one chamber by the advancing web, said last mentioned means being adapted to supply such secondary gas to such companion chamber under a temperature condition which differs from that of the primary gas supplied to the one chamber, each of said gas supplying means including a plurality of nozzles located in close juxtaposition to the strip path and disposed to direct supplied gas against the strip in the form of jets, valve means controlling the supply of primary gas to said one chamber, and including an actuatable element at each of the primary supply nozzles and valve means controlling the supply of secondary gas to the companion chamber, and including an actuatable element at each of the secondary supply nozzles whereby the strip advancing through the chambers is subjected to treatment predominantly by such primary gas during operation of the apparatus with the primary gas supply valve open and the secondary gas supply valve closed and by such secondary gas during operation with the secondary valve open and the primary valve closed, the switching of the treatment from one gas to the other being effected substantially immediately upon the actuation of said valve elements at the nozzles.

14. Apparatus for continuously conditioning a textile web comprising an oven, means for advancing the web through the oven under tension and along a predetermined path, means for supplying gas to the web in the oven, electrical resistance radiant heating means supported within the oven and disposed to heat the web by radiant energy while the web is under treatment by the supplied gas, control means interposed between the radiant heating means and the path of the web and governing the supply of treating gas, said control means being movable between positions of minimum and maximum interception of radiant energy from said radiant heating means to the web, said maximum radiation position coinciding with maximum gas supply, and said minimum radiation position coinciding with minimum gas supply.

15. Apparatus for conditioning a textile web, said apparatus comprising an oven structure providing an enclosed treating chamber, means for advancing a web to be conditioned through the chamber of the oven structure and over a predetermined path therein, means for supplying treating gas to a web being advanced, said gas supply means including a plurality of nozzles spaced along the web path and disposed to direct treating gas against an advancing web in the form of jets at a succession of zones each of relatively small extent in the direction of web travel, a plurality of electrical resistance heat radiators adjacent and distributed along the length of the web path, said gas supply means including elements interposed between the electrical radiators and the web path and adapted to shield an advancing web from heat radiation, means controlling the heating of a web in said chamber, said control means comprising a plurality of members interposed between the heat radiators and the web path, and said members each being movable between a position of maximum and a position of minimum interception of radiant energy directed toward the web path from one of the radiators.

16. Apparatus for conditioning a textile web, said apparatus comprising an oven structure providing an enclosed treating chamber, means for advancing a web to be conditioned through the chamber of the oven structure and over a predetermined path therein, means for supplying treating gas to a web being advanced, said gas supply means including a plurality of nozzles spaced along the web path and disposed to direct treating gas against an advancing web in the form of jets at a succession of zones each of relatively small extent in the direction of web travel, a plurality of electrical resistance heat radiators supported one in each of the nozzles, said gas supply means including elements interposed between the electrical radiators and the web path and adapted to shield an advancing web from heat radiation, means controlling the treating of a web in said chamber, said control means comprising a plurality of members located one in each of the nozzles and disposed between the respective radiators and the web path, said members each being movable between positions of maximum and minimum interception of radiant energy directed toward the web path from one of the radiators, and each of said control members substantially closing the nozzle in which it is located when in said maximum interception position and opening such nozzle when in said minimum interception position.

17. In an oven for heating a web travelling therethrough over a predetermined path, a supporting structure, a plurality of nozzles carried by said structure and disposed transversely of the path of the web adjacent the web path for conducting gas toward and directing gas upon the web when it is travelling in said path, common means for heating and blowing hot gas through a plurality of said nozzles, dampers in said nozzles movable from open positions for throttling the flow of gas therethrough, individually controlled radiant heaters separately disposed in separate nozzles through which hot gas is blown upon the web for providing selective supplemental heat for the web in and at selected nozzles, said heaters being disposed in said nozzles through which hot gas is blown more remotely from the path of the web than the dampers therein whereby the dampers may simultaneously throttle the flow of said hot gas to the web and obstruct radiation from said heaters to the web, and means for moving said dampers.

18. Web conditioning apparatus as defined in claim 1 in which electrical resistance heaters are disposed within the hot gas supplying and impinging means and are distributed one at each of the zones along the web path.

19. Web conditioning apparatus as defined in claim 18 in which at each zone the individual valve means is interposed between the electrical heater and the path of the web.

20. Web conditioning apparatus as defined in claim 4 in which electrical resistance heaters are disposed within the gas jet supplying and impinging means on the one side of the web and the control dampers are interposed between the electrical heaters and the web.

21. In an oven for heating and cooling a web travelling therethrough over a predetermined path, a supporting structure, a plurality of nozzles carried by said structure and disposed transversely of the path of the web adjacent the web path for conducting gas toward and directing gas upon the web when it is travelling in said path, common means for heating and blowing hot gas through a plurality of said nozzles, means for blowing cold gas through others of said nozzles, dampers in said nozzles movable from open positions for throttling the flow of gas therethrough, individually controlled radiant heaters separately disposed in separate nozzles through which hot gas is blown upon the web for providing selective supplemental heat for the web in and at selected nozzles, said heaters being disposed in said nozzles through which hot gas is blown more remotely from the path of the web than the dampers therein whereby the dampers may simultaneously throttle the flow of said hot gas to the web and obstruct radiation from said heaters to the web, and means for moving said dampers.

22. Apparatus for conditioning a textile web, said apparatus comprising an oven structure providing an enclosed treating chamber, means for advancing a web to be conditioned through the chamber of the oven structure and over a predetermined path therein, means for supplying hot gas at a uniform rate to a series of zones distributed along the path of a web advancing in the chamber, means for supplying cold gas at a uniform rate to said zones, control means individually associated with the hot gas supply means at each zone governing the flow of hot gas to the web path at each zone, control means individually associated with the cold gas supply means at each zone governing the flow of cold gas to the web path at each zone, each hot and cold control means being respectively actuatable independently of each other, hot and cold control means to vary the number of zones along the web path to which hot gas is supplied and the number of such zones to which cold gas is supplied in adjusting the apparatus to vary the ratio of the length of that portion of the web path to which hot gas is supplied to the length of that portion thereof to which cold gas is supplied.

23. An apparatus for continuously conditioning a textile strip comprising oven means defining a treating chamber in which the conditioning takes place and means adapted to tension the strip and advance it under tension to travel over a predetermined path including a portion located within the chamber, the combination of means to heat the strip including a heater and duct means outside the oven adapted to recirculate hot air over a closed path and also including a plurality of nozzles spaced along said portion of the strip path and disposed to direct such hot air to flow against a section of the advancing strip in the form of jets at a succession of zones each of relatively small extent in the direction of strip travel, means independent of the heating means to cool the strip, said cooling means including a blower and duct means outside the oven adapted to supply cold air over one predetermined path and to withdraw such cold air over another predetermined path respectively to and from the strip path and including a plurality of nozzles spaced along said same portion of the strip path and disposed to direct cold air so supplied to flow against the same section of the advancing strip in the form of jets at a succession of zones each of relatively small extent in the direction of strip travel, means at and actuatable to control the flow of air through the hot air nozzles to govern the heating of the strip, and means at and actuatable to control the flow of air through the cold air nozzles to govern the cooling of the strip.

References Cited in the file of this patent
UNITED STATES PATENTS

| | | |
|---|---|---|
| 1,670,991 | Schilde | May 22, 1928 |
| 1,802,407 | Danninger et al. | Apr. 28, 1931 |
| 1,986,776 | Moore | Jan. 1, 1935 |
| 2,022,593 | Fuykers | Nov. 26, 1935 |
| 2,038,457 | Venturini | Apr. 21, 1936 |
| 2,052,948 | Simpson | Sept. 1, 1936 |
| 2,060,430 | Spooner | Nov. 10, 1936 |
| 2,065,636 | Whipple et al. | Dec. 29, 1936 |
| 2,321,974 | Bird | June 15, 1943 |
| 2,343,351 | Wedler | Mar. 7, 1944 |
| 2,350,168 | Karns | May 30, 1944 |
| 2,362,309 | Ross | Nov. 7, 1944 |
| 2,389,586 | Andrews | Nov. 27, 1945 |
| 2,402,621 | Gifford | June 25, 1946 |
| 2,414,891 | Offen | Jan. 28, 1947 |
| 2,499,142 | Helmus | Feb. 28, 1950 |
| 2,501,480 | Stec | Mar. 21, 1950 |
| 2,569,264 | Stone | Sept. 25, 1951 |
| 2,578,744 | Rusca et al. | Dec. 18, 1951 |
| 2,581,018 | Hatay | Jan. 1, 1952 |
| 2,590,849 | Dungler | Apr. 1, 1952 |
| 2,590,850 | Dungler | Apr. 1, 1952 |
| 2,593,320 | Lewis et al. | Apr. 15, 1952 |
| 2,629,162 | Peck | Feb. 24, 1953 |
| 2,656,449 | Elgar | Oct. 20, 1953 |
| 2,666,994 | Dungler | Jan. 26, 1954 |
| 2,691,202 | Parkes | Oct. 12, 1954 |
| 2,713,212 | Taylor | July 19, 1955 |
| 2,724,907 | Walter | Nov. 29, 1955 |
| 2,734,794 | Calton | Feb. 14, 1956 |
| 2,807,096 | Kullgren et al. | Sept. 24, 1957 |
| 2,807,097 | Kullgren et al. | Sept. 24, 1957 |